(12) United States Patent
Murayama

(10) Patent No.: US 11,262,956 B2
(45) Date of Patent: Mar. 1, 2022

(54) COMMUNICATION SYSTEM, SERVER SYSTEM, AND TERMINAL APPARATUS

(71) Applicant: Canon Kabushiki Kaisha, Tokyo (JP)

(72) Inventor: Michihei Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/167,226

(22) Filed: Feb. 4, 2021

(65) Prior Publication Data

US 2021/0240416 A1 Aug. 5, 2021

(30) Foreign Application Priority Data

Feb. 5, 2020 (JP) .............................. JP2020-018208

(51) Int. Cl.
*G06F 15/00* (2006.01)
*G06F 3/12* (2006.01)
*G06K 1/00* (2006.01)

(52) U.S. Cl.
CPC .......... *G06F 3/1236* (2013.01); *G06F 3/1204* (2013.01); *G06F 3/1226* (2013.01); *G06F 3/1288* (2013.01)

(58) Field of Classification Search
CPC .... G06F 3/1236; G06F 3/1204; G06F 3/1226; G06F 3/1288
USPC ............................... 358/1.15, 1.14, 1.13, 1.1
See application file for complete search history.

(56) References Cited

U.S. PATENT DOCUMENTS

| 2013/0027744 | A1* | 1/2013 | Takahashi | G06F 3/1285 358/1.15 |
| 2013/0163038 | A1* | 6/2013 | Oishi | G06F 3/1288 358/1.15 |
| 2020/0045124 | A1 | 2/2020 | Wayama et al. | |
| 2020/0045205 | A1* | 2/2020 | Wayama | G06F 3/1232 |

FOREIGN PATENT DOCUMENTS

JP 2017073167 A 4/2017

* cited by examiner

*Primary Examiner* — Douglas Q Tran
(74) *Attorney, Agent, or Firm* — Venable LLP

(57) ABSTRACT

A server system transmits, to a terminal apparatus, list information of a service list, communication information corresponding to a service in the list and used to communicate with a service providing server system, and authentication information corresponding to an apparatus. The terminal apparatus selects service(s) from the list, and transmits, based on the communication information corresponding to the selected service(s), the authentication information to service providing server system(s) corresponding to the selected service(s). The server system executes a registration process for enabling the apparatus to use the service corresponding to each of the service providing server system(s), if the authentication information is received from each of the service providing server system(s).

17 Claims, 5 Drawing Sheets

FIG. 3A

| UUID | SERVICE ID | REGISTRATION DATE |
|---|---|---|
| sjhdf-8ehaf | S-01 | 2013/01/01 |
| 8932h-zxbia | S-02 | 2013/01/01 |
| jn39s-3jhsd | S-03 | 2013/01/01 |

| UUID | SERVICE ID | TERMINAL ID | AUTHENTICATION CODE | AUTHENTICATION RESULT ACCORDING TO SERVICE | REGISTRATION DATE |
|---|---|---|---|---|---|
| aabas-32ckj | S-01 | AAA-01 | 8sf39-9osdf | True | 2015/01/02 |
| hewu3-sjsdf | S-03 | AAA-02 | 0pkqm-c25kd | False | 2015/01/03 |
| sdgio-8sdsa | S-03 | CCC-03 | ces3m-k204d | True | 2015/01/04 |

FIG. 3C

| UUID | TERMINAL ID | TERMINAL ID | REGISTRATION DATE |
|---|---|---|---|
| 5rghb-9kggf | AAA-01 | XXX-XXX-XXX | 2015/01/01 |
| Nc35g-8hxff | BBB-02 | XXX-YYY-YYY | 2015/01/02 |
| Vhdrt-65tyg | CCC-03 | XXX-YYY-ZZZ | 2015/01/03 |

| UUID | TERMINAL ID | SERVICE ID | REGISTRATION DATE |
|---|---|---|---|
| 675fd-1fssa | AAA-01 | S-01 | 2015/01/02 |
| Maaua-9disa | CCC-03 | S-03 | 2015/01/04 |

| FIRST GENERATION | FIRST COMMUNICATION METHOD | A COUNTRY | SERVICE A |
| --- | --- | --- | --- |
| | | B COUNTRY | SERVICE B |
| | | C COUNTRY | SERVICE C |
| | SECOND COMMUNICATION METHOD | A COUNTRY | SERVICE B |
| | | B COUNTRY | SERVICE C |
| | | C COUNTRY | SERVICE D |
| SECOND GENERATION | SECOND COMMUNICATION METHOD | A COUNTRY | SERVICE E |
| | | B COUNTRY | SERVICE F |
| | | C COUNTRY | SERVICE G |
| | THIRD COMMUNICATION METHOD | A COUNTRY | SERVICE A |
| | | B COUNTRY | SERVICE B |
| | | C COUNTRY | SERVICE F |

FIG. 4B

| GROUP A | SERVICE A |
| --- | --- |
| | SERVICE B |
| GROUP B | SERVICE A |
| | SERVICE B |
| | SERVICE C |
| GROUP C | SERVICE B |
| | SERVICE D |
| | SERVICE E |

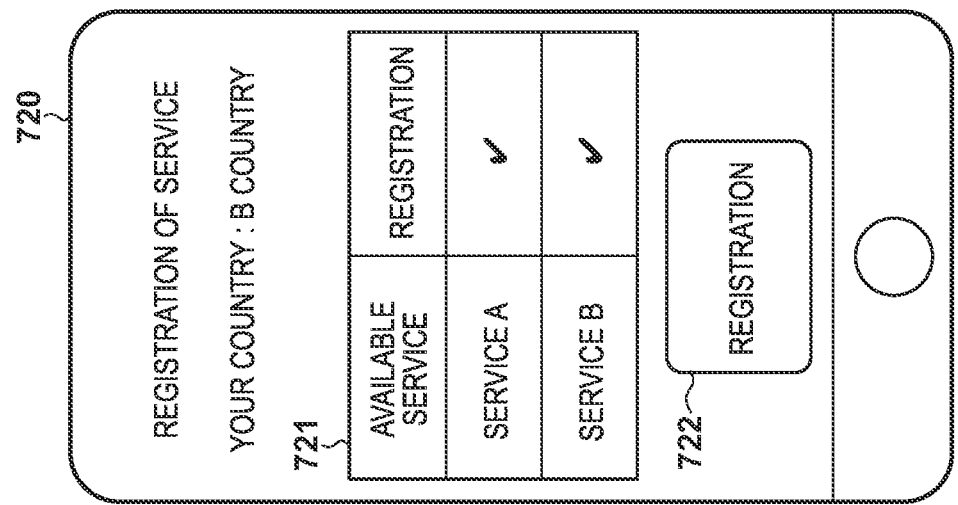
F I G. 5C
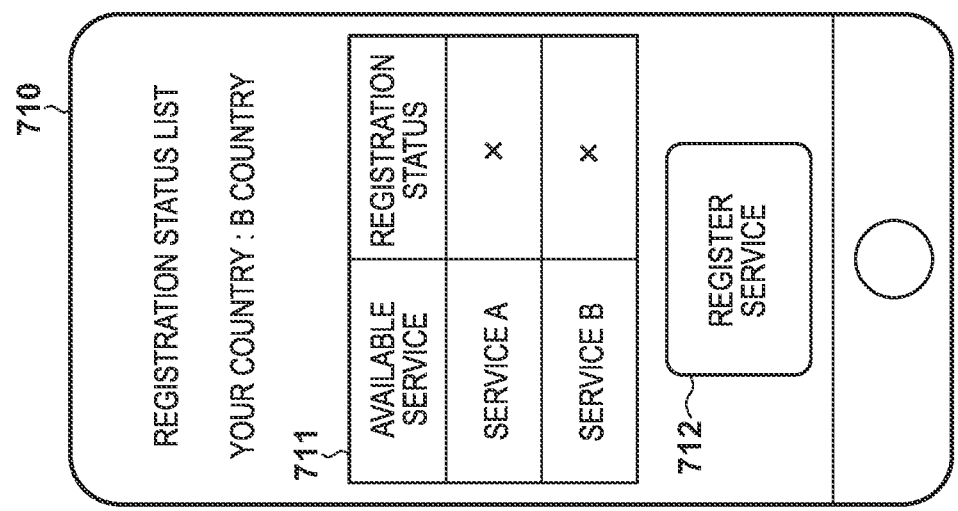
F I G. 5B
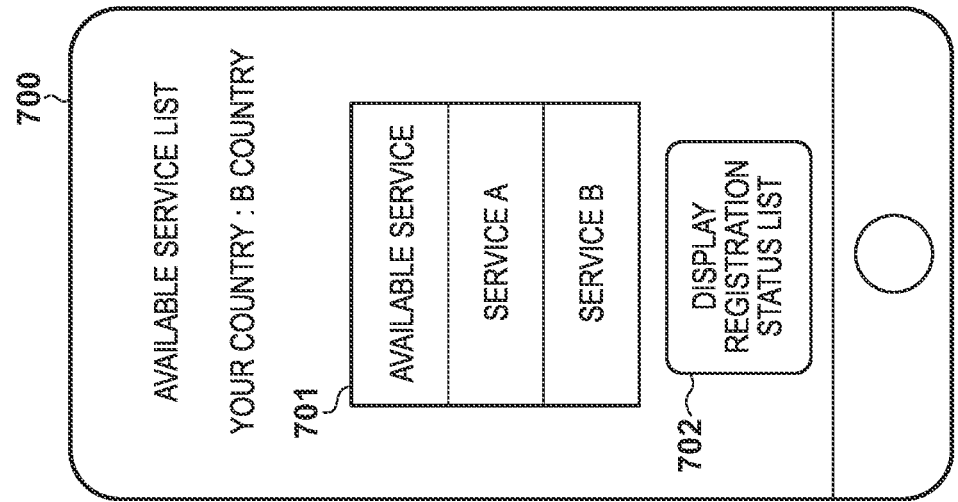
F I G. 5A

COMMUNICATION SYSTEM, SERVER SYSTEM, AND TERMINAL APPARATUS

BACKGROUND OF THE INVENTION

Field of the Invention

The present invention relates to a communication system, a server system, and a terminal apparatus.

Description of the Related Art

Japanese Patent Laid-Open No. 2017-73167 discloses a terminal that can use a service provided by a service server via a mediation server.

SUMMARY OF THE INVENTION

The present invention provides a communication system that improves the convenience in displaying a service available on a terminal, a server system, and a terminal apparatus.

The present invention in one aspect provides a communication system comprising a predetermined server system and a terminal apparatus, wherein the predetermined server system includes a first transmitting unit configured to transmit, to the terminal apparatus, list information related to a service list, a second transmitting unit configured to transmit, to the terminal apparatus, communication information that corresponds to a service included in the list and is used to communicate with a service providing server system different from the predetermined server system, and a third transmitting unit configured to transmit, to the terminal apparatus, authentication information corresponding to a predetermined apparatus which is different from the terminal apparatus, the predetermined server system, and the service providing server system, the terminal apparatus includes a selection unit configured to select one or a plurality of services from the list based on the list information, and a fourth transmitting unit configured to transmit, based on one or a plurality of pieces of the communication information corresponding to the one or the plurality of services selected from the list, the authentication information to one or a plurality of the service providing server systems corresponding to the one or the plurality of services selected from the list, and the predetermined server system includes an execution unit configured to execute a registration process for enabling the predetermined apparatus to use the service corresponding to each of the one or the plurality of the service providing server systems, if the authentication information is received from each of the one or the plurality of the service providing server systems.

According to the present invention, it is possible to improve the convenience in displaying a service available on a terminal.

Further features of the present invention will become apparent from the following description of exemplary embodiments with reference to the attached drawings.

BRIEF DESCRIPTION OF THE DRAWINGS

FIGS. 3A to 3D are tables each showing a configuration example of data stored in a relay server according to the first embodiment;

FIGS. 4A and 4B are tables showing a configuration example of a service list table according to the first embodiment; and FIGS. 5A to 5C are views showing a configuration example of a service registration screen according to the first embodiment.

DESCRIPTION OF THE EMBODIMENTS

Figure 1:
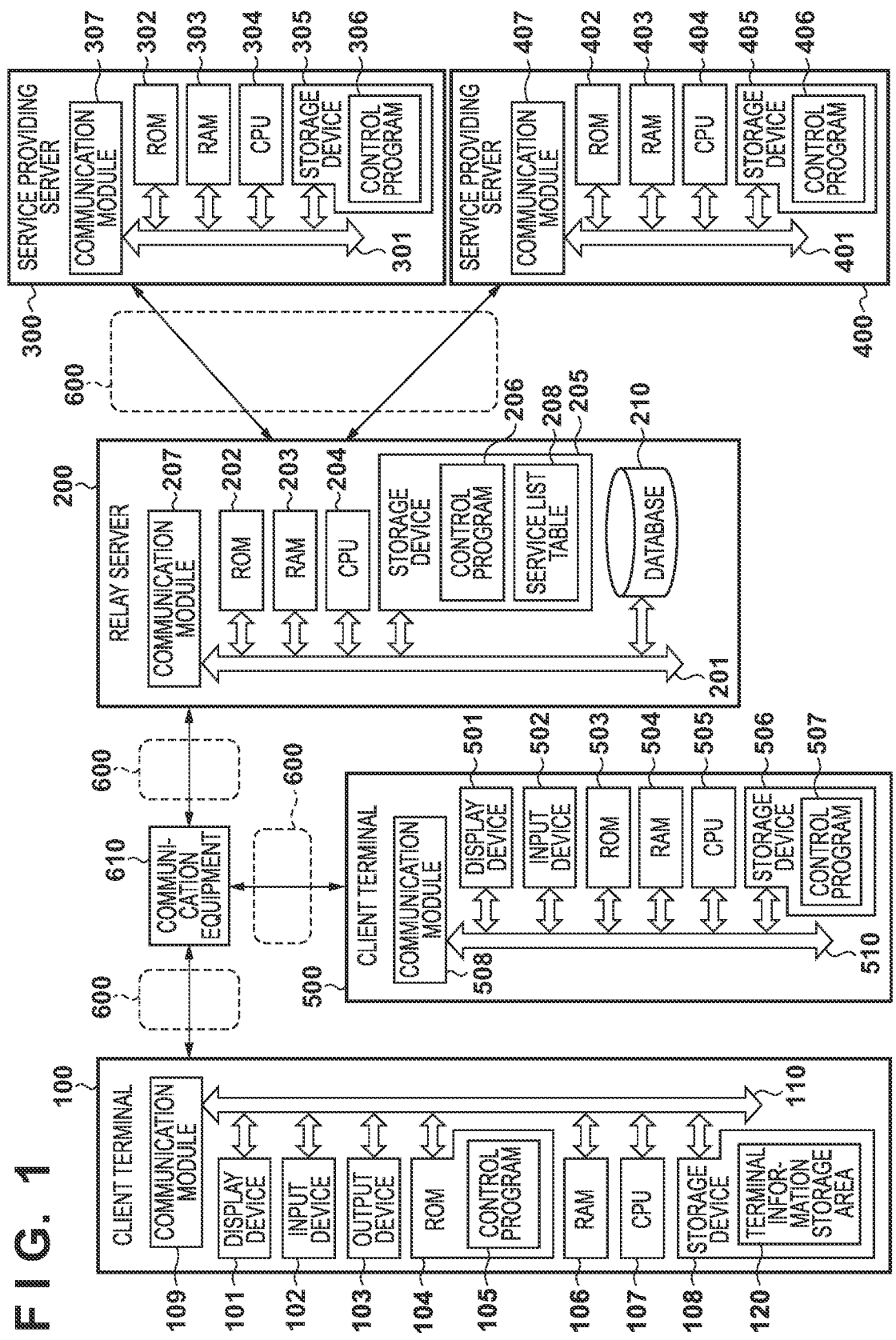
FIG. 1 is a block diagram showing a configuration example of an information processing system according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

There is a form in which, by letting a user select a service to be used on a terminal from a list of services available for the terminal, the terminal is enabled to use the service. In this form, it is required to improve the convenience for displaying the services available on the terminal.

According to one aspect of the present invention, it is possible to improve the convenience for displaying services available on a terminal.

First Embodiment

[System Configuration]

With reference to FIG. 1, a configuration example of an information processing system according to one embodiment of the present invention will be described. In this embodiment, the information processing system is formed to include a client terminal 100, a relay server 200, a service providing server 300, a service providing server 400, and a client terminal 500.

Each of the client terminal 100 and the client terminal 500 indicates a terminal used by a user. In this embodiment, the client terminal 100 is described as a printing apparatus having a print function and a scan function. On the other hand, the client terminal 500 is described as a mobile terminal such as a smartphone including a user interface. Note that the combination of the client terminals 100 and 500 is not limited to this, and the present invention may be applied to another apparatus.

The relay server 200 is a server that communicates with the client terminal 100 to receive information from the client terminal 100 and transmit information to the client terminal 100. Further, the relay server 200 similarly communicates with the client terminal 500. The client terminal 100, the client terminal 500, and the relay server 200 transmit and receive information via a network 600 and a communication equipment 610. The relay server 200 has an authentication function, and issues authentication information (to be referred to as authentication code hereinafter) for authenticating each terminal in accordance with a request from the client terminal 100 or the client terminal 500, or executes an authentication process based on the authentication code.

The service providing server 400 is a server that provides a user with a service via the client terminal 100. For example, if the client terminal 100 is a printing apparatus, a service for giving points in accordance with the number of printed sheets may be provided. The user can use the points to purchase ink or the like. Further, the service providing server 400 provides a service for monitoring the status of consumables in the client terminal 100 and when, for example, the amount of printing agent (for example, ink) used for image formation is about to run out, automatically placing an order. The service providing server 400 is a server that provides a service different from that provided by the service providing server 300. Here, it is described that the service providing server 400 has almost the same arrangement as the service providing server 300. In addition to the services described above, a service for printing data stored on a network, a service for storing the data scanned by the client terminal 100 on a cloud, a service for allowing unlimited use of printing agents for a certain period of time by paying a certain amount of fee to the service provider, or the like may be provided. Note that the services provided by the respective service providing servers are not limited to the services described above, and another service may be provided. Further, the service providing server may be installed for each predetermined area (for example, country or region) serving as the service providing range.

The relay server 200 and each of the service providing servers 300 and 400 are communicably connected to each other via the network 600. The network 600 need only be capable of data transmission/reception, and may be any of, for example, a LAN such as the Internet, a WAN, a telephone line, a dedicated digital line, an ATM or frame relay line, a cable television line, a data broadcasting wireless channel, and the like, or may be a so-called communication network implemented by combining them, or the like. The communication equipment 610 is a communication equipment, for example, a router, an access point, or the like, that mainly connects the client terminal 100 and the client terminal 500 via the network 600. Note that the client terminal 100 and the client terminal 500 may be configured to perform direct communication by near field communication or the like.

Next, an example of the hardware arrangement of each apparatus will be described. The client terminal 100 is formed to include a communication module 109, a display device 101, an input device 102, an output device 103, a ROM (Read Only Memory) 104, a RAM (Random Access Memory) 106, a CPU (Central Processing Unit) 107, and a storage device 108. The display device 101 displays a result input to the client terminal 100 by the user, a result obtained by executing a given process, and the like. The input device 102 accepts, for example, a user instruction. The output device 103 outputs the result of the instruction input by the input device 102. As has been described above, if the client terminal 100 is a printing apparatus, the output device 103 corresponds to a printing unit that performs image formation.

The ROM 104 is a non-volatile storage area and stores, for example, program codes to be executed by the client terminal 100 and various kinds of data to be used in a process. The various kinds of data stored in the ROM 104 are loaded to the RAM 106 and executed, as needed. The program codes include a control program 105 for controlling the communication module 109, the display device 101, the input device 102, the output device 103, and the RAM 106. The CPU 107 is an arithmetic processing unit, and implements various kinds of processes by reading out and executing the programs held in the ROM 104 or the storage device 108. The storage device 108 is a device that stores data, and the stored contents are written or read by the CPU 107. The storage device 108 includes a terminal information storage area 120, and information of the client terminal 100 is stored therein. The respective units included in the client terminal 100 are communicably connected to each other via an electrical wiring bus 110.

For example, if the client terminal 100 is a printing apparatus, the display device 101 displays size setting of a print medium such as a paper sheet, setting of color printing or monochrome printing, and the like. The user selects and inputs such printing settings using the input device 102. When the program code stored in the ROM 104 is loaded to the RAM 106 and executed by the CPU 107, the output device 103 performs a printing operation and outputs a print product. The control program 105 includes a program for counting the number of printed sheets, a program for detecting the amount of printing agent used for printing, a program for determining whether the printing agent is created exclusively for a certain service, or the like. In the terminal information storage area 120, pieces of information of the client terminal 100 such as the serial number, the model name, the total number of sheets printed so far, the consumption amount of printing agent, the product model number of consumables, the cleaning date/time of each part in the apparatus, the number of times of cleaning thereof, the network information, and the like are stored.

The relay server 200 is formed to include a communication module 207, a ROM 202, a RAM 203, a CPU 204, and a storage device 205. The storage device 205 stores a control program 206 for controlling the entire relay server 200, and a service list table 208. The service list table 208 will be described later with reference to FIGS. 4A and 4B. The relay server 200 further includes a database 210. The database 210 stores user information and information necessary for providing a service, which are read and written by the relay server 200. In this embodiment, the database 210 is formed to include a service master table 211, a service registration table 212, a client terminal registration table 213, and a client terminal/service correspondence table 214. The details of respective tables will be described with reference to FIGS. 3A to 3D. Respective units included in the relay server 200 are communicably connected to each other via an electrical wiring bus 201. Note that in this embodiment, the relay server accessed by the client terminal 100 differs depending on the generation of the client terminal 100. The generation of the client terminal 100 is classified according to, for example, the model number or identification number of the client terminal 100. That is, the information processing system may include a plurality of relay servers. Note that the relay server for the client terminal 100 of the newest generation is indicated as the relay server 200 here. The correspondence between the client terminal 100 and the relay server may be determined by determining the generation of the client terminal 100 by another server that relays the communication between the client terminal 100 and the relay server. In this embodiment, the relay server as the communication destination of the client terminal 100 differs depending on the generation of the client terminal 100 since the communication method and the communication interface used by the client terminal 100 differ depending on the generation. That is, it is assumed that the available communication method and communication interface are also different between the respective relay servers. In this embodiment, the client terminal 100 can perform communication using either of XMPP, HTTP, and MQTT protocols, and the available protocol differs depending on the generation. Note that the available protocols may be different even if the client terminals are of the same generation. Further, in this embodiment, it is assumed that the client terminal 500 accesses the relay server 200 regardless of the generation of the client terminal 500 and the generation of the client terminal 100 with which the client terminal 500 is in communication.

The service providing server 300 is formed to include a communication module 307, a ROM 302, a RAM 303, a CPU 304, and a storage device 305. The storage device 305 stores a control program 306 for controlling the entire service providing server 300. The respective units included in the service providing server 300 are communicably connected to each other by an electrical wiring bus 301. The service providing server 400 has the arrangement similar to that of the service providing server 300, and is formed to include a communication module 407, a ROM 402, a RAM 403, a CPU 404, and a storage device 405. The storage device 405 stores a control program 406 for controlling the entire service providing server 400. The respective units included in the service providing server 400 are communicably connected to each other by an electrical wiring bus 401.

The client terminal 500 is formed to include a communication module 508, a display device 501, an input device 502, a ROM 503, a RAM 504, a CPU 505, and a storage device 506. The storage device 506 stores a control program 507 for controlling the entire client terminal 500. The respective units included in the client terminal 500 are communicably connected to each other by an electrical wiring bus 510. In this embodiment, a smartphone is taken as an example of the client terminal 500, but the present invention is not limited to this and, for example, an information processing apparatus such as a tablet terminal or a PC (Personal Computer) may be used.

One client terminal 100 and one client terminal 500 are shown in FIG. 1, but the present invention is not limited to this. For example, there may be a plurality of the client terminals 100 and a plurality of the client terminals 500. Alternatively, the client terminals 100 and 500 may be the same terminal, or may be different terminals. Further, the relay server 200 is formed by one server in this embodiment, but it may be formed by a plurality of servers. Furthermore, the server system according to this embodiment is formed by two service providing servers in FIG. 1, but the present invention is not limited to this form. The server system may be formed by one server, and the functions of the two service providing servers described above may be provided by the one server. Alternatively, the server system may be formed by three or more servers, and the functions of the two service providing servers described above may be provided by the three or more servers. A plurality of the service providing servers may provide similar services, or may provide different services. The hardware arrangement of each apparatus described above is merely an example, and another component may be included.

[Process Sequence]

Figure 2:
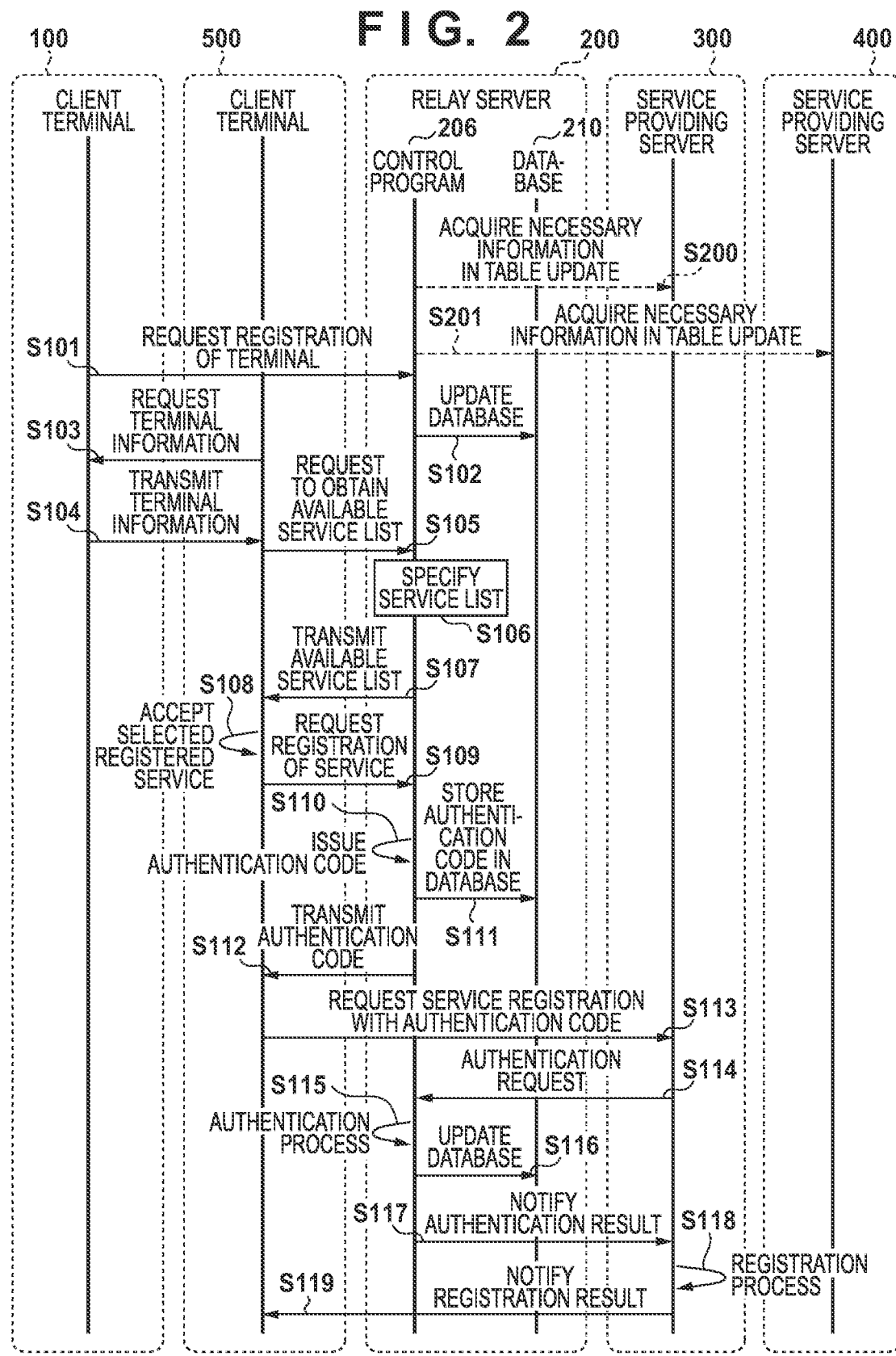
FIG. 2 is a sequence chart of a process according to the first embodiment.

FIG. 2 is a sequence chart for explaining the process sequence according to this embodiment. The process in each apparatus is implemented by the CPU of the main body of the process reading out the program stored in the ROM, the storage device, or the like. Note that this sequence chart explains an example in which the client terminal 100 is an apparatus of the newest generation and communicates with the relay server 200. If the client terminal 100 is an apparatus of an old generation, the client terminal 100 communicates with the relay server that supports the old generation, and the process executed by the relay server 200 in the following description is executed by the relay server that supports the old generation. Note that even in this case, the client terminal 500 communicates with the relay server 200.

The control program 206 of the relay server 200 requests the service providing server 300 and the service providing server 400 for information of services which the respective service providing servers can provide (steps S200 and S201). Based on the information acquired with this operation, the relay server 200 updates the service master table 211. Note that this request may be regularly made by the relay server 200, or may be made when a predetermine event occurs. Alternatively, it may be configured such that, when providable service contents are changed, each service providing server notifies the relay server 200 of the change. For the sake of descriptive convenience, only one request for service information to each service providing server is shown in FIG. 2, but it is assumed that this process is repeatedly executed, and the contents of the service master table 211 are updated each time.

FIG. 3A shows a configuration example of the service master table 211 managed in the database 210 of the relay server 200 according to this embodiment. In the service master table 211, a service ID issued for each service provided by the service providing server is stored using the unique ID (to be written as UUID (Universally Unique Identifier) hereinafter) as the key. Further, the service master table 211 manages the registration date/time or the like as the attribute value. Note that in the description, it is assumed that each of the UUIDs used in respective tables shown in FIGS. 3A to 3D is unique to each table, and they do not correspond to each other among the tables.

In step S101, the client terminal 100 transmits the UUID of the self-terminal to the relay server 200 to request a registration process of the self-terminal. Here, the registration process means that, as shown in the client terminal registration table 213 shown in FIG. 3C, a record is newly generated in the database 210 of the relay server 200 while using the UUID of the client terminal 100 as the key.

In step S102, the relay server 200 registers the client terminal 100 in the client terminal registration table 213 of the database 210 in accordance with the registration request from the client terminal 100. Thus, the client terminal 100 is registered in the relay server 200. Here, a record including the unique ID (to be referred to as terminal ID hereinafter) of the client terminal 100 as the attribute value is generated. At this time, the detailed information (terminal information) of the terminal, the registration date/time, and the like are registered in the client terminal registration table 213 as other attribute values. Note that the pieces of information to be registered in the client terminal registration table 213 are not limited to those shown in FIG. 3C, and another information may be further registered and managed.

In step S103, the client terminal 500 requests the client terminal 100 for the terminal information of the client terminal 100. The terminal information requested here is, for example, the information for specifying the generation of the client terminal 100 or the information indicating the communication method that the client terminal 100 can use. The information for specifying the generation of the client terminal 100 is, for example, the serial number or the model number which is the unique identification information assigned to the client terminal 100. The information indicating the communication method that the client terminal 100 can use is, for example, the identification information (MAC address) set in the communication module 109 included in the client terminal 100. The request here may be made via the communication equipment 610, or may be made by performing direct communication between the client terminals.

In step S104, the client terminal 100 transmits the terminal information of the self-terminal, which is the information requested in step S103, to the client terminal 500.

In step S105, the client terminal 500 requests the relay server 200 for a service list showing services available for the client terminal 100. At this time, the client terminal 500 also transmits the terminal information of the client terminal 100 acquired in step S104. That is, in step S105, the relay server 200 receives the request for the service list and the terminal information of the client terminal 100. Further, at this time, the relay server 200 specifies, from the IP information acquired in the communication with the client terminal 500 in step S105, the country where the client terminal 500 is located.

In step S106, the relay server 200 specifies the service list to be transmitted to the client terminal 500 as a response to the request. In this embodiment, the relay server 200 executes this process based on the terminal information of the client terminal 100, which is the information acquired from the client terminal 100 by the client terminal 500 and acquired from the client terminal 500 by the relay server 200.

The details of the service list specifying method in step S106 will be described. First, based on the terminal information of the client terminal 100 acquired as described above, the relay server 200 specifies various kinds of information used to specify the service list. In this embodiment, the relay server 200 specifies, as the information (specifying information) used to specify the service list, the generation of the client terminal 100 and the communication method that the client terminal 100 can use. The relay server 200 may specify the service list using information other than the terminal information of the client terminal 100. In this embodiment, the information of the country where the client terminal 500 is located (an example of location information), which has been specified in step S105, is also used to specify the service list. Note that instead of the information of the country where the client terminal 500 is located, information of the country where the client terminal 100 is located may be used. The information of the country where the client terminal 100 is located may be included in the terminal information of the client terminal 100 acquired in step S105, or may be specified from the IP information acquired in the communication with the client terminal 100 in step S101.

Based on the specifying information specified as described above and a table for specifying the service list shown in FIG. 4A, the relay server 200 specifies the service list to be transmitted to the client terminal 500 as a response to the request. More specifically, the relay server 200 specifies the service group corresponding to the specifying information from the table shown in FIG. 4A. For example, if the generation of the client terminal 100 is the 1st generation, the communication method used by the client terminal 100 is the first communication method, and the country where the client terminal 500 is located is country A, group A is specified. FIG. 4B shows services belonging to each group. The services belonging to the group specified from the table shown in FIG. 4A form the service list to be transmitted to the client terminal 500 as a response to the request. Note that the number and types of the services belonging to each group are not limited. Only one service may be included in one group, or a plurality of services may be included in one group. Note that the respective tables described above are held in the memory of the relay server 200.

Note that the service that can be included in each group is, for example, a service for giving points to the user account of the client terminal 100 based on the number of paper sheets printed by the client terminal 100 or the used amount of printing agent. That is, if this service is registered in the client terminal 100, information related to the number of paper sheets printed by the client terminal 100 or the used amount of printing agent is communicated between the service providing server providing this service and the client terminal 100. Further, the service that can be included in each group is, for example, a service for automatically delivering paper or the printing agent to the user of the client terminal 100 when the paper or printing agent held by the client terminal 100 runs out (or runs low). That is, if this service is registered in the client terminal 100, information related to the amount of paper or printing agent held by the client terminal 100 is communicated between the service providing server providing this service and the client terminal 100. The service that can be included in each group is not limited to the examples described above, and various services may be included in each group. Further, the relay server 200 may relay the communication between the service providing server and the client terminal 100.

If different venders provide services of similar contents, a plurality of services of similar contents having different names may be included in each group. Further, the relay server 200 may appropriately update the information of each group. For example, if a new service that can be registered in the client terminal 100 is started to be provided, this service may be added to an arbitrary group. Similarly, a service may be deleted from an arbitrary group. This enables appropriately and easily updating the list of services suitable for the characteristics (terminal information) of the client terminal 100. If the information of the group has been updated, this may be notified to the client terminal 500 and the client terminal 100 corresponding to the updated group. For example, if the contents of group A are updated, this is notified to the client terminal 500 which has received the information of group A as the service list in step S107, and the client terminal 100 which communicates with the client terminal 500. For example, if a service is added to the group, it may be notified that the new service is available. Further, for example, if a service is deleted from the group, it may be notified that there is a service no longer available, or the service no longer available may be notified. Note that if information related to an update to be performed in the future can be acquired before the group is updated, information indicating the contents of the update to be performed in the future or information indicating the date/time of the update to be performed in the future may be notified.

In step S107, the relay server 200 transmits, to the client terminal 500, the information related to the service list specified in step S106 as a response to the request accepted in step S105. For example, the relay server 200 transmits, to the client terminal 500, information of the name of each service included in the service list specified in step S106.

The information of the service list acquired in step S107 is displayed on the client terminal 500 such that it can be checked. A screen 700 shown in FIG. 5A shows a configuration example of the screen upon displaying, on the display device 501 of the client terminal 500, services available for the client terminal 100. In a list 701, a list of the services available for the corresponding client terminal (here, the client terminal 100) is displayed. The terminal information (country information in this example) of the client terminal

100 may also be displayed. If a button 702 is pressed, a transition to a screen 710 shown in FIG. 5B is made. The screen 710 shown in FIG. 5B shows the registration status of each available service. In this embodiment, by registering a service, the user can use the registered service via the client terminal 100. A list 711 shows the registration status of each available service. If a button 712 is pressed, a transition to a screen 720 shown in FIG. 5C is made to register the service to be used. The screen 720 shown in FIG. 5C is a screen for instructing registration of the service to be used. In a list 721, the available service is selectably displayed. At this time, it may be configured such that, for example, the check box is unchecked when the registration of the already registered service is deleted. If a button 722 is pressed, the relay server 200 is instructed by the client terminal 500 to register the service selected in the list 721.

In step S108, the client terminal 500 accepts, from the user, a service registration instruction via the screens shown in FIGS. 5A to 5C. At this time, one service may be registered, or a plurality of services may be registered. In the description here, it is assumed that registration of the service provided by the service providing server 300 is instructed.

In step S109, based on the instruction accepted in step S108, the client terminal 500 requests the relay server 200 to register the service. At this time, the client terminal 500 also transmits the information of the client terminal 100.

In step S110, if a service registration request is accepted from the client terminal 500, the relay server 200 issues an authentication code for each service indicated by the registration request. That is, the number of authentication codes to be issued corresponds to the number of services to be registered. The authentication code to be issued is different for each service and each client terminal. The authentication code issue method here is not particularly limited, but it is assumed that, for example, a character string that has not been used or issued so far is issued.

In step S111, the relay server 200 stores the authentication code issued in step S110 in the service registration table 212. FIG. 3B shows a configuration example of the service registration table 212 held in the database 210 of the relay server 200. The service registration table 212 is a table for managing the service registered in the client terminal 100. The service registration table 212 includes the UUID of the client terminal 100 as the key. As attribute values, the terminal ID of the client terminal 100 that uses the service, the service ID to be used, the authentication code, the authentication result by the service, and the registration date/time are included. The authentication result by the service will be described later. Note that the pieces of information managed in the service registration table 212 are not limited to those described above, and another information may be further managed. If a plurality of services are registered in the client terminal 100, pieces of information related to the plurality of services are linked to one UUID.

In step S112, as a response to the service registration request received in step S109, the relay server 200 transmits the authentication code issued in step S110 to the client terminal 500. Note that at this time, information (URL or the like) for accessing the service providing server that provides the service to be registered may also be transmitted.

In step S113, the client terminal 500 transmits, to the service providing server that provides the service to be registered, a registration request together with the authentication code received from the relay server 200. As has been described above, it is assumed here that registration of the service provided by the service providing server 300 is instructed, and the client terminal 500 transmits the regis- tration request to the service providing server 300. At this time, the information of the client terminal 100 which uses the service may also be transmitted. Note that if a plurality of services are to be registered and they are provided by different service providing servers, registration requests are transmitted to the respective service providing servers together with the authentication codes. Note that at this time, the client terminal 500 may execute a login process to the service provided by the service providing server 300.

In step S114, based on the service registration request accepted from the client terminal 500 in step S113, the service providing server 300 requests the relay server 200 to execute authentication using the authentication code indicated in the registration request. Therefore, it is assumed that the service providing server 300 recognizes the address of the relay server 200 in advance. Note that there may be a case in which one service providing server 300 corresponds to a plurality of services, and receives a plurality of registration requests (a plurality of authentication codes). In this case, the service providing server 300 makes authentication requests having the number corresponding to the number of the registration requests.

In step S115, the relay server 200 executes an authentication process based on the authentication request from the service providing server 300. Here, the authentication is executed based on whether the authentication code included in the authentication request from the service providing server 300 matches the authentication code stored in the service registration table 212. The authentication process is executed for each service (authentication code) for which the authentication request has been made.

In step S116, the relay server 200 updates the service registration table 212 based on the authentication result in step S115. In the item "authentication result" in the service registration table 212, "True" is set if the authentication has succeeded, and "False" is set if the authentication has failed. Further, in the client terminal/service correspondence table 214 shown in FIG. 3D, the relay server 200 creates a record that associates the terminal ID of the client terminal 100 and the service ID stored in the service master table 211 while using the UUID as the key. With the creation of this record, the registration of the service in the client terminal 100 is completed.

In step S117, the relay server 200 transmits the authentication result in step S115 to the service providing server 300 as a response to the authentication request in step S114.

In step S118, based on the authentication result received in step S117, the service providing server 300 executes a registration process related to the registration request received in step S113. For example, if the authentication result is "False", no registration process is executed, and if the authentication result is "True", the registration process is executed so as to enable the client terminal 100 to use the service. The details of the registration process here may differ depending on the service to be provided.

In step S119, the service providing server 300 notifies the client terminal 500 of the process result of the registration request received in step S113. Then, this process sequence is terminated.

After the above-described sequence, the client terminal 100 can use the service in accordance with the registration result. The operation at the time of using the service may differ depending on the contents of the service. Upon using the service, if the client terminal 100 communicates with the service providing server 300 which provides the service, the client terminal 100 may communicate via the relay server that supports the generation of the client terminal 100.

Note that after the authentication code is authenticated in step S115, it may be used as the ID (identification information) by the service providing server 300 to uniquely recognize the client terminal 100. For example, when the service providing server 300 provides a service for printing data stored on the server, it is necessary to specify a printing apparatus which is the client terminal 100. At this time, the ID of the client terminal 100 may be designated. In addition, the relay server 200 associates the ID and the client terminal 100, and requests the client terminal 100 to perform printing. In this case, in the registration process in step S118, the service providing server 300 may execute the registration process of registering the authentication code as the ID indicating the client terminal 100. On the other hand, the ID different from the authentication code may be used as the identification information of the client terminal 100.

In the process sequence shown in FIG. 2, the client terminal 100 requests the relay server 200 to register the self-terminal, and then the client terminal 500 requests the relay server 200 to register the service. However, the order of registration operations may be reversed, or another combination may be used. Further, the client terminal 500 directly accesses the relay server 200, but it may access the relay server 200 via another server.

In this embodiment, the timing of acquiring, by the client terminal 500, the service list table 208 available for the client terminal 100 is not limited to the timing described above. For example, this timing may be the timing when information of a service provided by each service providing server is updated, or the client terminal 500 may be configured to regularly inquire the relay server 200.

The authentication code issued in step S110 in FIG. 2 is processed only in the communication among the apparatuses without being viewed by the user, but it may be notified to the user via the client terminal 500. For example, there is a case in which, for the security purpose, the authentication code is not processed in the communication among the apparatuses but the service providing server requests the user to input and transmit the authentication code. In such a case, the user may confirm the authentication code notified by the relay server 200, manually input it to the client terminal 500, and then request the service providing server to execute the authentication process in step S113.

In the sequence chart shown in FIG. 2, a form has been described in which the communication between the client terminal 500 and the relay server 200 is started after the client terminal 100 is registered in the relay server 200 according to the communication between the client terminal 100 and the relay server 200 in step S101. However, the present invention is not limited to this form, and the communication between the client terminal 500 and the relay server 200 may be started before the client terminal 100 is registered in the relay server 200. In this case, the client terminal 100 may be registered in the relay server 200 at a timing when registration or use of the service is needed. Note that among the services used in this system, some services cannot be registered or used unless the client terminal 100 has been registered in the relay server 200, but other services can be registered or used without the registration of the client terminal 100 in the relay server 200. Therefore, for example, information as to whether the client terminal 100 has already been registered in the relay server 200 may be used to specify the service list in step S106. In other words, the service list to be specified may differ depending on whether the client terminal 100 has already been registered in the relay server 200. Note that in this embodiment, it is assumed that the relay server 200 can grasp the registration status of the client terminal 100 in another relay server. Accordingly, even if the client terminal 100 is registered in and accesses a relay server different from the relay server 200, the relay server 200 can appropriately specify the service list.

As has been described above, according to this embodiment, when registering a service to be used on a client terminal, it is possible to acquire a service list suitable for each client terminal, so that the convenience in registration can be improved.

Second Embodiment

As the second embodiment of the present invention, a form will be described in which when a client terminal 500 has requested to acquire a list of services available for a client terminal 100, a relay server 200 executes a redirect process of the client terminal 500. With this process, the user directly accesses a server of the redirect destination, and acquires the list of services available for the client terminal 100. Note that the second embodiment will be described while omitting a description of the arrangement overlapping with that in the first embodiment and focusing on differences from the first embodiment.

For example, assume that the client terminal 500 has accessed the relay server 200 to request a list of services available for the client terminal 100. At this time, the relay server 200 redirects the client terminal 500 to a specific URL (Uniform Resource Locator) of the service providing server 300. In this embodiment, the relay server 200 holds and manages information of a destination which serves as the redirection destination when the relay server 200 is accessed by the client terminal 500.

An operation according to this embodiment will be described with reference to the sequence chart shown in FIG. 2. In step S107, the relay server 200 transmits, as information related to the service list specified in step S106, not only the name of the service included in the service list specified in step S106 but also the URL information for accessing (redirecting to) the service providing server that provides the service. Then, the client terminal 500 accesses the service providing server using the URL information. Note that in step S107, if a plurality of services included in the service list are provided by different service providing servers, different pieces of URL information for accessing the different service providing servers are transmitted. Then, the client terminal 500 accesses the plurality of service providing servers using the different pieces of URL information. Note that with the communication started by this access, the client terminal 500 can grasp the service currently provided by the service providing server. The client terminal 500 displays, on the screen 700 shown in FIG. 5A, a list of services currently provided by the service providing serve, which the client terminal 500 has grasped as described above.

The service currently provided by the service providing server can be appropriately changed. However, the update may not be rapidly reflected on the table held by the relay server 200. In this case, with the method according to the first embodiment, the service not currently provided by the service providing server may be displayed on the screen 700 shown in FIG. 5A, or the new service that the service providing server started to provide may not be displayed thereon. In this embodiment, since the client terminal 500 is redirected to the service providing server, and displays the service after grasping the service currently provided by the service providing server. Therefore, the accurate information can be reflected on the screen 700.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018208, filed Feb. 5, 2020, which is hereby incorporated by reference herein in its entirety.

What is claimed is:

1. A communication system comprising a predetermined server system and a terminal apparatus, wherein
the predetermined server system includes
a first transmitting unit configured to transmit, to the terminal apparatus, list information related to a service list,
a second transmitting unit configured to transmit, to the terminal apparatus, communication information that corresponds to a service included in the list and is used to communicate with a service providing server system different from the predetermined server system, and
a third transmitting unit configured to transmit, to the terminal apparatus, authentication information corresponding to a predetermined apparatus which is different from the terminal apparatus, the predetermined server system, and the service providing server system,
the terminal apparatus includes
a selection unit configured to select one or a plurality of services from the list based on the list information, and
a fourth transmitting unit configured to transmit, based on one or a plurality of pieces of the communication information corresponding to the one or the plurality of services selected from the list, the authentication information to one or a plurality of the service providing server systems corresponding to the one or the plurality of services selected from the list, and
the predetermined server system includes
an execution unit configured to execute a registration process for enabling the predetermined apparatus to use the service corresponding to each of the one or the plurality of the service providing server systems, if the authentication information is received from each of the one or the plurality of the service providing server systems.

2. The system according to claim 1, wherein the one or the plurality of pieces of the communication information corresponding to the one or the plurality of services selected from the list are transmitted to the terminal apparatus after the one or the plurality of services are selected from the list in the terminal apparatus.

3. The system according to claim 1, wherein
the predetermined server system further includes a control unit configured to control whether to execute the registration process based on the authentication information transmitted to the terminal apparatus and the authentication information received from the service providing server system.

4. The system according to claim 1, wherein
the terminal apparatus further includes a receiving unit configured to receive a notification indicating whether the registration process has been executed.

5. The system according to claim 1, wherein
the predetermined server system further includes a specifying unit configured to specify a country where the terminal apparatus is located or a country where the predetermined apparatus is located, and
the list information related to a service list corresponding to the specified country is transmitted to the terminal apparatus.

6. The system according to claim 1, wherein
the predetermined server system further includes an information receiving unit configured to receive information related to the predetermined apparatus, and
the list information related to a service list corresponding to the information related to the predetermined apparatus is transmitted to the terminal apparatus.

7. The system according to claim 6, wherein the information related to the predetermined apparatus includes information related to a communication method used by the predetermined apparatus.

8. The system according to claim 6, wherein the information related to the predetermined apparatus is received from the predetermined apparatus.

9. The system according to claim 6, wherein the information related to the predetermined apparatus is received from the terminal apparatus.

10. The system according to claim 1, wherein the predetermined server system further includes an update unit configured to update the list information based on information received from one or a plurality of the service providing server systems.

11. The system according to claim 1, wherein the predetermined apparatus is a printer.

12. The system according to claim 11, wherein the list includes a service related to printing performed by the predetermined apparatus.

13. The system according to claim 11, wherein the predetermined server system is formed by one or a plurality of servers.

14. The system according to claim 11, wherein the service providing server system is formed by one or a plurality of servers.

15. The system according to claim 1, wherein the registration process is a process in which a notification for enabling the predetermined apparatus to use the service corresponding to each of the one or the plurality of the service providing server systems is transmitted to the one or the plurality of the service providing server systems.

16. A server system including:
- a first transmitting unit configured to transmit, to a terminal apparatus, list information related to a service list,
- a second transmitting unit configured to transmit, to the terminal apparatus, communication information that corresponds to a service included in the list and is used to communicate with a service providing server system different from the predetermined server system,
- a third transmitting unit configured to transmit, to the terminal apparatus, authentication information corresponding to a predetermined apparatus which is different from the terminal apparatus, the predetermined server system, and the service providing server system, and
- an execution unit configured to execute a registration process for enabling the predetermined apparatus to use the service corresponding to each of the one or the plurality of the service providing server systems, if the authentication information is received from each of the one or the plurality of the service providing server systems selected from the list in the terminal apparatus.

17. A terminal apparatus including:
- a first receiving unit configured to receive, from a predetermined server system, list information related to a service list;
- a second receiving unit configured to receive, from the predetermined server system, communication information that corresponds to a service included in the list and is used to communicate with a service providing server system different from the predetermined server system;
- a third receiving unit configured to receive, from the predetermined server system, authentication information corresponding to a predetermined apparatus which is different from the terminal apparatus, the predetermined server system, and the service providing server system;
- a selection unit configured to select one or a plurality of services from the list based on the list information; and
- a transmitting unit configured to transmit, based on one or a plurality of pieces of the communication information corresponding to the one or the plurality of services selected from the list, the authentication information to each of one or a plurality of the service providing server systems corresponding to the one or the plurality of services selected from the list.

* * * * *